United States Patent [19]
Maudsley

[11] 3,867,457
[45] Feb. 18, 1975

[54] PREPARATION OF NINHYDRIN

[75] Inventor: Russell J. Maudsley, Llanerch-Y-Mor, near Holywell, Wales

[73] Assignee: Newton Chambers & Company Limited, Sheffield, England

[22] Filed: May 18, 1973

[21] Appl. No.: 361,738

[30] Foreign Application Priority Data
June 13, 1972 Great Britain.................... 27647/72

[52] U.S. Cl. ............................................... 260/590
[51] Int. Cl............................................. C07c 49/82
[58] Field of Search..................................... 260/590

[56] References Cited
UNITED STATES PATENTS

| | | | |
|---|---|---|---|
| 3,366,690 | 1/1968 | Wood | 260/590 |
| 3,419,616 | 12/1968 | Wood | 260/590 |

*Primary Examiner*—Daniel D. Horwitz
*Attorney, Agent, or Firm*—Lawrence Rosen; E. Janet Berry

[57] ABSTRACT

Ninhydrin is prepared by oxidation of bis indan 1,3-dione with an oxidising agent in the presence of a catalyst.

5 Claims, No Drawings

PREPARATION OF NINHYDRIN

This invention relates to a new method of making indan 1,2,3-trione hydrate which is commonly known as ninhydrin and has the formula:

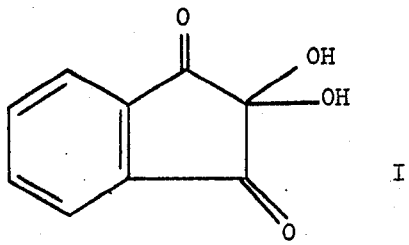

One known method for making ninhydrin is described in J. Org. Chem. 28, 1896 (1963) but is unsatisfactory since it involves a large number of stages and also because it results in the formation, as a by-product, of methyl mercaptan. Methods involving oxidation of indan 1,3-dione and its 2-bromo derivative are known (J.A.C.S. 79, 6562 (1957) and U.S. Pat. No. 3,385,894). However these methods are not very satisfactory. Thus it is difficult, or at least inconvenient, to obtain in good yield the starting material in a condition of adequate purity. Also, although one method involves the use of dimethyl sulphoxide as oxidant another method involves the use of selenium dioxide and this is unpleasant to handle.

We have now found that ninhydrin can be made by oxidising bis indan 1,3-dione, which has the formula:

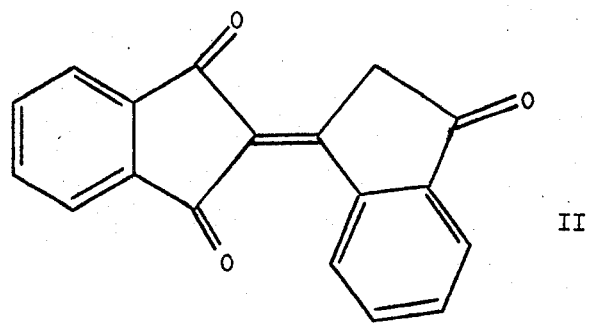

by reacting it with an oxidising agent in the presence of a catalyst.

This method has the advantage that it is easier and more convenient to carry out than the preparation of ninhydrin from indan 1,3-dione or indan 2-bromo-1,3-dione, due at least in part to the fact that it is easier to obtain in good yield bis indan 1,3-dione of adequate purity than indan 1,3-dione of adequate purity.

Bis indan 1,3-dione can conveniently be made by acid catalysed condensation of indan 1,3-dione. It is not necessary to purify the bis indan 1,3-dione before use in the process of hydrothiophen invention.

Any convenient oxidising agent may be used for the oxidation of bis indan 1,3-dione to ninhydrin but the most suitable ones to use are sulphoxide oxidants free of reducing substituents in which two valencies on the sulphur are substituted by organic radicals which may be linked together to form, with the sulphur, a heterocyclic ring. The organic radicals usually contain carbon chains and are preferably alkyl radicals. Thus suitable oxidants are cyclic organic sulphoxides, e.g. tetra hydrothiopphen oxide, and dialkyl sulphoxides, suitable alkyl groups including methyl, ethyl, normal propyl and isopropyl. The preferred oxidising agent for use in the invention is dimethyl sulphoxide.

The catalyst is preferably bromine, iodine, hydrogen iodide or hydrogen bromide or a compound that forms one of these during the reaction.

The oxidation of bis indan 1,3-dione to ninhydrin is preferably conducted in a liquid phase at elevated temperature. Thus it may be conducted in a melt but preferably it is conducted in solution. If excess of a sulphoxide oxidising agent is used, particularly one of those mentioned, it is possible for this excess to serve as a solvent. Otherwise, or in addition, an inert solvent may be included. The solvent may be an organic polar solvent, for example ethylacetate, an organic non-polar solvent, for example benzene or toluene, or an aqueous mixture containing an organic solvent.

The reaction must be conducted at elevated temperature and normally the temperature will be above 40°C, and most usually above 60°C.

The following is an example of the invention.

Bis indan 1,3-dione 54.8 gm (0.2 m) is dissolved in dimethyl sulphoxide 124.8 gm (1.6 m) and 48% hydrobromic acid 12.8 gm. added.

The mixture is heated over 75°–100°C for 3 hours allowing dimethyl sulphide to distil (atmospheric). Excess dimethyl sulphoxide is removed under vacuum and the residue stirred with 200 mls. of 0.3 N-hydrochloric acid at 100°C for 1 hour. The mixture is filtered and the solution decolourised and concentrated to one third volume to yield 58 gms of ninhydrin 73% of theoretical on standing.

What is claimed is:

1. A method for making Ninhydrin comprising reaction of bis indan 1,3-dione, in the presence of a catalyst, with an oxidising agent at a temperature above 40°C, said catalyst being selected from the group consisting of bromine, iodine, hydrogen iodide and hydrogen bromide and compounds that form any of these during the reaction, and said oxidising agent being selected from the group consisting of organic sulphoxides, free of reducing substituents in which the sulphoxide sulphur atom carries two distinct organic radicals and organic sulphoxides, free of reducing substituents, in which the sulphoxide sulphur atom carries two organic radicals that are linked together.

2. A method according to claim 1 in which the sulphoxide is selected from the group consisting of cyclic organic sulphoxides and dialkyl sulphoxides.

3. A method according to claim 2 in which the sulphoxide is used in excess, this excess serving as a solvent for the reaction.

4. A method according to claim 1 in which the reaction is carried out in solution, an inert solvent being present.

5. A method according to claim 1 in which the reaction is carried out at a temperature greater than 60°C.

* * * * *